(12) United States Patent
Lee

(10) Patent No.: US 8,538,953 B2
(45) Date of Patent: Sep. 17, 2013

(54) TWO PHASE METHOD FOR PROCESSING MULTI-WAY JOIN QUERY OVER DATA STREAMS

(75) Inventor: Won Suk Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/422,252

(22) Filed: Mar. 16, 2012

(65) Prior Publication Data

US 2012/0246146 A1 Sep. 27, 2012

Related U.S. Application Data

(60) Provisional application No. 61/466,800, filed on Mar. 23, 2011.

(51) Int. Cl.
*G06F 7/00* (2006.01)
*G06F 17/30* (2006.01)

(52) U.S. Cl.
CPC ............................... *G06F 17/30516* (2013.01)

USPC ........................................... 707/714; 707/747

(58) Field of Classification Search
CPC .................................................. G06F 17/30516
USPC ................................................. 707/714, 749
See application file for complete search history.

(56) References Cited

U.S. PATENT DOCUMENTS

| | | | |
|---|---|---|---|
| 7,461,057 B2 * | 12/2008 | Radestock et al. | .................... 1/1 |
| 2007/0294217 A1 * | 12/2007 | Chen et al. | ........................ 707/2 |
| 2012/0096042 A1 * | 4/2012 | Brockett et al. | .............. 707/798 |

* cited by examiner

*Primary Examiner* — Miranda Le
(74) *Attorney, Agent, or Firm* — Senniger Powers LLP

(57) ABSTRACT

Provided is a method for processing a multi-way join query comprising: filling matrix-based synopses according to input source stream and generating a result vector evaluating a query equation defined by the matrix multiplication operation of the matrix-based synopses corresponding to nodes of a query walk; and generating a result tuple for the multi-way join query from the matrix-based synopses based on the result vector.

12 Claims, 9 Drawing Sheets

FIG. 4

| |
|---|
| Input: a batched query equation $E(y_Q|\Delta S_x) = K_1 * K_2, ..., * K_m$ |
| Output: result vectors $V_m$ |
| Algorithm *Preprocessing phase* |
| 1  $V_1 = K_1$ <br> 2  for $i=1$ to $m-1$ do <br> 3    If $K_{i+1}$ is $1 \times m$ then <br> 4      $V_{i+1}$ = element−wise−multiplication($V_i, K_{i+1}$); <br> 5    Else <br> 6      $V_{i+1}$ = matrix−multiplication($V_i, K_{i+1}$); <br> 7    End if <br> 8  End for <br> 9  Return V |

Input: (1) a batched query equation $E(Y_Q|\Delta S_x) = K_1 * K_2, ..., * K_m$ (2) result vectors $V_k (1 \leq k \leq m)$ Output: Refind result vectors $\widetilde{V}_k (1 \leq k \leq m)$

---

Algorithm *Identification Step*

1  $\widetilde{V}_m = V_m$
2  for $i = m-1$ to $1$ do
3    If $K_{i+1}$ is $1 \times m$ then
4      $\widetilde{V}_i = \widetilde{V}_{i+1}$;
5    Else
6      $\widetilde{V}_i = matrix-multiplication(\widetilde{V}_{i+1}, K_{i+1}^T)$;
7    End if
8  End for
9  Return $\widetilde{V}$

FIG. 8a

Input: (1) a batched query index equation $EI(Y_Q|\Delta S_x) = H_1 {}^*H_2, ...,{}^*H_l{}^T$ (2) result vectors $\tilde{V}_k (1 \leq k \leq l)$ Output: Final query results $RI_l$

| Algorithm *materialization step* |
|---|
| 1  for $i = 1$ to $|\tilde{V}_l|$ do |
| 2    if $\tilde{V}_l[i] \neq 0$ then |
| 3      $RI_1[i] \leftarrow$ insert tuples in $H_1[i]$ |
| 4    end if |
| 5  end if |
| 6  for $i = 1$ to $l-1$ do |
| 7    if the $i^{-th}$ enumeration operation $= \ominus$ then |
| 8      Self_filtering($RI_i$, pred) |
| 9    //pred=join predicate corresponding to the $e_i$ in $\overline{Y}_Q$ |
| 10    eles |
| 11    If $H_{i+1}$ is a vector and $cattr_i \neq cattr_{i+1}$) then |
| 12      //$cattr_i$ =a column attribute of $RI_i$ |
| 13      //$cattr_{i+1}$ =a column attribute of $H_{i+1}$ |
| 14      $RI_i$ =Reassignment($RI_i, cattr_{i+1}$) |
| 15    Else if $H_{i+1}$ is a matrix and $cattr_i \neq rattr_{i+1}$ then |
| 16      //$rattr_{i+1}$ =a row attribute of $H_{i+1}$ |
| 17      $RI_i$ =Reassignment($RI_i, rattr_{i+1}$) |
| 18    End if |
| 19    Concatenation($RI_i, H_{i+1}, \tilde{V}_{i+1}$) |
| 20 End for |

FIG. 8b

Algorithm *Self_filtering(RI, pred)*
1   for $i = 1$ to $|RI|$ do
2     for every tuple in RI[i]
3       If a tuple $r$ in RI[i] dose not satisfy *pred* then
4         remove $r$
5       End if
6     End for
7   End for Algorithm *Reassignment(RI, attr)*
1   for $i = 1$ to $|RI|$ do
2   for every tuple $r$ in RI[i]
3      //$h(x)$ is a hash function for an attribute *attr*
4      insert $r$ into $T[h(r.attr)]$
5    End if
6   End for
7   Return T Algorithm *Concatenation(RI, H, $\tilde{V}$)*
1   If $H$ is a $m_a \times m_b$ matrix then
2    For $i = 1$ to $m_b$
3     For $j = 1$ to $m_a$
4      If $\tilde{V}[j] \neq 0$ then
5      Insert join results of the tuples in $RI[j]$ with those in $H[j,i]$ into $T[j]$
6       End if
7      End for
8     End for
9   Else //H is a $1 \times m_a$ vector
10    For $i = 1$ to $m_a$
11     If $\tilde{V}[j] \neq 0$ then
12      Insert join results of the tuples in $RI[i]$ with those in $H[i]$ into $T[i]$
13     End if
14    End for
15   End if
16   Return $T$

TWO PHASE METHOD FOR PROCESSING MULTI-WAY JOIN QUERY OVER DATA STREAMS

CROSS-REFERENCE TO RELATED APPLICATIONS

This application claims the benefit of the U.S. provisional Patent Application No. 61/466,800 filed in the United States Patent and Trademark Office on Mar. 23, 2011, the entire contents of which are incorporated herein by reference.

TECHNICAL FIELD

The present invention relates to a method for processing a multi-way join query, and more specifically, to a method for processing a multi-way join query over a data stream and a computer readable recording medium in which a program for executing the method is recorded.

BACKGROUND ART

Recently, most application fields such as web click monitoring, sensor data processing, or network traffic analysis need to process a massive unbounded sequence of data elements that are continuously generated. The massive unbounded sequence of data elements that are continuously generated is defined as data stream. In these application fields, a continuous query is used to represent a specific event and monitor whether the corresponding event occurs whenever new data is generated.

Such a continuous query is largely classified into two types as follows in accordance with the intended purpose: the first type is a general purpose query which generates, as a result, a tuple that satisfies the corresponding continuous query and the second type is a detection-only query, which replies only whether newly incoming data (tuple) satisfies the continuous query. In order to process the detection-only query, it is required to know whether the newly incoming tuple satisfies the query, but information on a tuple that satisfies the corresponding query is not required.

A multi-way join query having multiple join predicates is used to combine and monitor the several source data streams and studies about the multi-way join query have conducted. However, most previously known research efforts for continuous query processing use tree-structured execution plans employed in a conventional database management system in order to determine the execution order of binary join operations specified in one continuous query. However, since the selectivity of a join operation under the data stream environment varies depending on the time, the tree-structured execution plans require to be continuously optimized, which causes a serious run-time overhead.

Further, previous researches have mostly focused effort on a general-purpose query, but researches on the detection-only query have been not studied. Therefore, even though the detection-only query is provided, actual join should be performed in order to generate a result of the corresponding query.

SUMMARY OF THE INVENTION

The present invention has been made in an effort to provide a method for processing a multi-way join query including a first phase that examines a given multi-way join query whether newly incoming tuples satisfy the query and a second phase that materializes a specific result tuple for the query based on the result of the first phase, and a computer readable recording medium in which a program for executing the method is recorded.

An exemplary embodiment of the present invention provides a method for processing a multi-way join query, including: with respect to a join graph where the respective source streams are denoted by a node and a join predicate is denoted by an edge for the multi-way join query, generating a query walk that is a sequence of nodes and edges in the join graph such that every edge in the join graph is visited at least once in a continuous walk of the join graph starting from a specific node; based on the query walk, generating matrix based synopses for the nodes, where the matrix based synopses include a window synopsis that manages the number of tuples allocated to entries, a window index synopsis that manages a list of addresses of the tuples assigned to the entry, a batch synopsis that is a batch of the window synopsis, and a batch index synopsis that is a batch of the window index synopsis; when a hash function is given to a join attribute domain of the query walk, if the source stream is input, hashing the tuple of the source stream by the hash function to fill the window synopsis, the window index synopsis, the batch synopsis, and the batch index synopsis; when the query equation is defined by the matrix multiplication operation of the window synopses corresponding to the nodes of the query walk, and the batched query equation is defined by the query equation in which a window synopsis corresponding to a specific stream is replaced with a batch synopsis corresponding to the specific stream in the query equation, evaluating the batched query equation to generate a result vector; and based on the result vector, generating the result tuple for the multi-way join query from the batch index synopsis and the window index synopsis.

Another exemplary embodiment of the present invention provides a method for processing a multi-way join query, including: with respect to a join graph where the respective source streams are denoted by a node and a join predicate is denoted by an edge for the multi-way join query, generating a query walk that is a sequence of nodes and edges in the join graph such that every edge in the join graph is visited at least once in a continuous walk of the join graph starting from a specific node; based on the query walk, generating matrix based synopses for the nodes, where the matrix based synopses include a window synopsis that manages the number of tuples allocated to entries, a window index synopsis that manages a list of addresses of the tuples assigned to the entry, a batch synopsis that is a batch of the window synopsis, and a batch index synopsis that is a batch of the window index synopsis; when a hash function is given to a join attribute domain of the query walk, if the source stream is input, hashing the tuple of the source stream by the hash function to fill the window synopsis, the window index synopsis, the batch synopsis, and the batch index synopsis; and when the query equation is defined by the matrix multiplication operation of the window synopses corresponding to the nodes of the query walk, and the batched query equation is defined by the query equation in which a window synopsis corresponding to a specific stream is replaced with a batch synopsis corresponding to the specific stream in the query equation, evaluating the batched query equation to generate a result vector.

Yet another exemplary embodiment of the present invention provides a method for processing a multi-way join query, when with respect to a join graph where the respective source streams are denoted by a node and a join predicate is denoted by an edge for the multi-way join query, a query walk that is a sequence where nodes and edges in the join graph are aligned such that every edge in the join graph is visited at least once in a continuous walk of the join graph starting from a specific node is defined and matrix-based synopses for the nodes of the query walk are defined, the method including: (a) filling the matrix-based synopses according to the input source stream and generating a result vector evaluating the query equation defined by the matrix multiplication operation of the matrix-based synopses corresponding to the nodes of the query walk; and (b) generating a result tuple for the multi-way join query from the matrix-based synopses based on the result vector.

Still another exemplary embodiment of the present invention provides a computer readable recording medium in which a program for executing the above multi-way join query processing method.

According to exemplary embodiments of the present invention, in the first phase, the given multi-way join query is examined whether the newly incoming tuples satisfy the query, and in the second phase, the specific result tuple for the query is materialized based on the result of the first phase. Therefore, without generating an actual result tuple, answers for a detection-only query may be provided. Further, if the exemplary embodiment of the present invention is applied to the general purpose query, tuples which cannot contribute to the actual query result do not perform the join, which results in efficiently performing a query.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 shows a pseudo code of a preprocessing phase for an n-way join query.

FIG. 6 shows a detailed pseudo code of the identification step.

FIGS. 8A and 8B show a detailed pseudo code in a materializing step.

Figure 1:
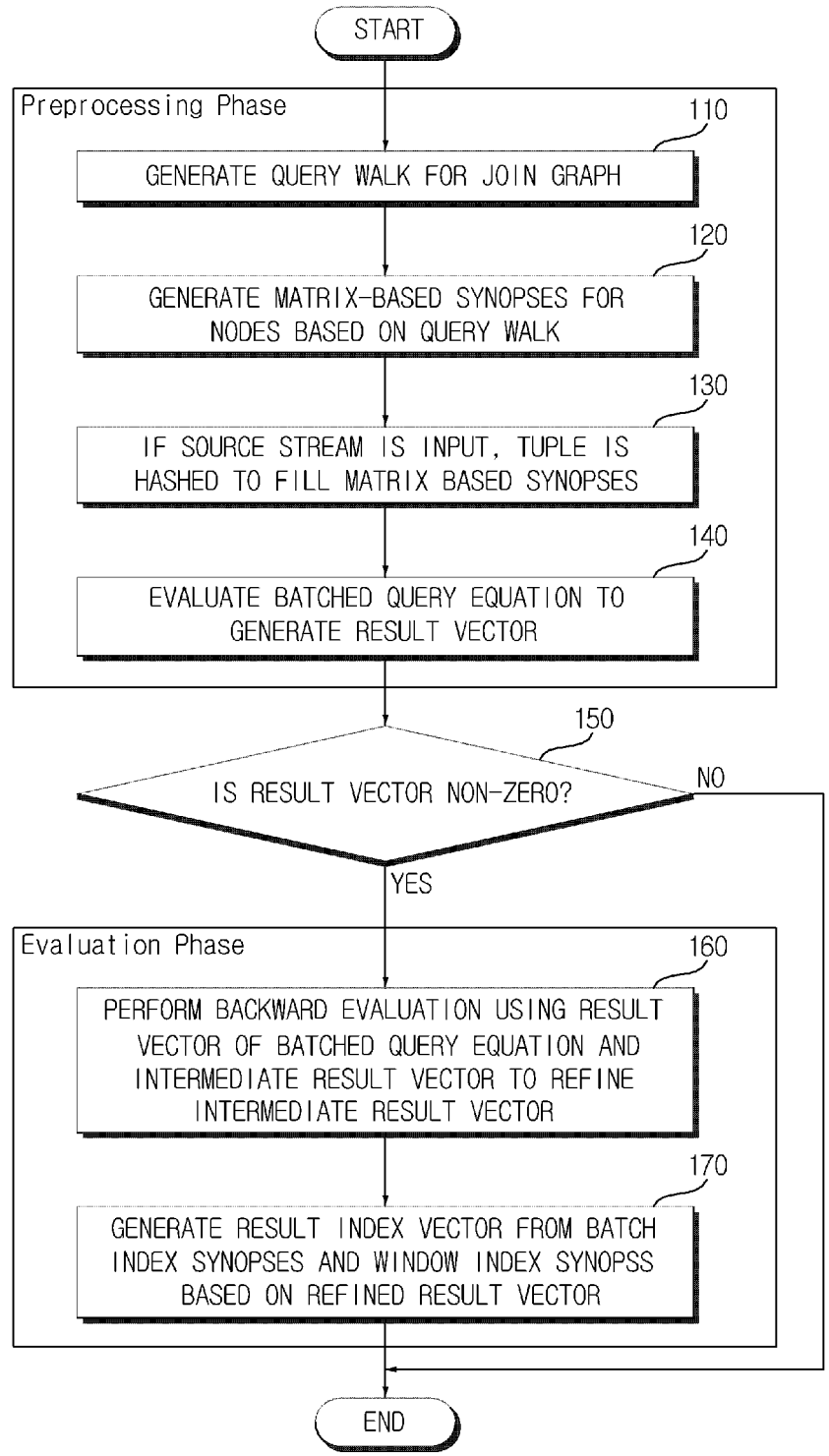
FIG. 1 is a flowchart of an overall method for processing a multi-way join query according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a flowchart of an overall method for processing a multi-way join query according to an exemplary embodiment of the present invention. Referring to FIG. 1, a method for processing a multi-way join query according to the exemplary embodiment mainly includes a preprocessing phase and an evaluation phase.

The preprocessing phase extracts on whether a set of newly incoming tuples satisfies a given multi-way join continuous query and information on a certain join property of a tuple that creates a final query result. If all tuples in the set of newly incoming tuples do not satisfy the corresponding query, the sequence does not proceed to next phase, that is, the evaluation phase. The evaluation phase joins only tuples that generate a result of an actual query based on the information obtained in the preprocessing phase to generate the result of the actual query.

According to the method for processing a multi-way join query of the exemplary embodiment, only the first phase, that is, the preprocessing phase is performed to obtain the answer for the detection-only query. The preprocessing phase examines whether the multi-way join query is satisfied using a matrix-based synopsis. In this case, depending on the size of the matrix-based synopsis, an error may be included little bit. The error is defined as a wrong answer of the detection-only query, that is, whether the corresponding query is satisfied. If the size of the matrix-based synopsis is significantly smaller than a size of a join attribute domain, the error becomes significant. Therefore, in the exemplary embodiment of the present invention, in order to improve the accuracy of the detection-only query, if a predetermined level or higher of error is generated in the preprocessing phase, the second stage, that is, the evaluation stage is performed to perform an actual join and then obtain an answer for the detection-only query.

If the exemplary embodiment of the present invention is applied to the general purpose query, tuples "(defined as unsuccessful tuples)" that do not contribute to the result of the actual query do not perform an actual join so that the query is efficiently performed.

Referring to FIG. 1, in the preprocessing phase, in a join graph where the respective source streams are denoted by a node, and a join predicate is denoted by an edge for the multi-way join query, a query walk that is a sequence of nodes and edges in the join graph is generated such that every edge in the join graph is visited at least once in a single continuous walk of the join graph starting from a specific node of the join graph (step 110).

Next, based on the query walk, matrix-based synopsis is generated for the nodes of the query walk (step 120). The matrix-based synopsis generated in step 120 include four types of synopses, that is, a window synopsis that manages the number of tuples assigned to entries of the corresponding synopsis, a window index synopsis that manages a list of addresses of the tuples assigned to the entries, a batch synopsis that is a batch of the window synopsis, and a batch index synopsis that is a batch of the window index synopsis.

A hash function is given to a join attribute domain of the query walk. If the source stream is input, the tuple of the source stream is hashed by the hash function to fill the window synopsis, the window index synopsis, the batch synopsis, and the batch index synopsis (step 130). That is, the window synopsis and the batch synopsis update the number of input tuples and the window index synopsis and the batch index synopsis update the address of the input tuple.

The query equation is defined by the matrix multiplication operation of the window synopsis corresponding to the nodes of the query walk, and the batched query equation is defined by the query equation in which a window synopsis corresponding to a specific stream (a source stream corresponding to newly incoming tuples) is replaced with a batch synopsis corresponding to the specific stream in the query equation. The batched query equation is computed to generate a result vector (step 140). If the generated result vector is zero (step 150), it is considered that the newly incoming tuples do not satisfy the query. Therefore, in this case, the evaluation phase is not performed. In contrast, if the result vector is non-zero (step 150), it is considered that any of newly incoming tuples satisfy the query so that the evaluation phase is performed.

The evaluation phase generates a final result tuple for the batched query equation from the batch index synopsis and the window index synopsis based on the result vector of step 140.

Under a join predicate where two source streams are joined with a certain join attribute, tuples of two streams having the same hash value of the hash function are defined as buddy tuples. When a join graph of a multi-way join query that joins n source streams and the query walk are given, if all tuples in a sequence having a distance of n, which consists of tuples of the source streams are buddy tuples, the sequence is defined as a complete connecting sequence. In the evaluation phase, backward evaluation is performed using a result vector of the batched query equation of step 140 and an intermediate result vector to refine the intermediate result vector so as to remove an entry that cannot be a candidate for any of complete connecting sequences from the intermediate result vector (step 160). Step 160 corresponds to an identification step which will be described below.

Next, based on the refined result vector, a result index vector having an address of the final result tuples as an entry is generated from the batch index synopsis and the window index synopsis (step 170). Step 170 corresponds to a materialization step, which will be described below.

Hereinafter, a method for processing a multi-way join query according to the exemplary embodiment of the present invention will be described in detail. For the convenience of the description, a construct of the matrix-based synopsis and a framework of the exemplary embodiment of the present invention will be described in chapter 1, and the preprocessing phase and the evaluation phase for the multi-way join query will be described in chapter 2.

1. Basic Constructs 1.1 Query Walks and Matrix-Based Synopsis

A multi-way join query may be represented by an undirected graph called a join graph. Here, each source stream is denoted by a node of the join graph and an edge between two nodes represents a join predicate of two source streams corresponding to the two nodes. The node is labeled by a name of the stream and the edge is labeled by a join attribute. All join predicates of the join graph are ordered as a sequence called a query walk defined in Definition 1.

Definition 1. Query Walks

If a join graph $G_Q=(N_Q, E_Q)$ for an n-way join query Q with n source streams $N_G=\{S_1, S_2, \ldots, S_n\}$ is given, a query walk $\gamma_Q = <v_1\ e_1\ v_2\ e_2 \ldots e_{m-1}\ v_m>$ ($n \leq m$) is a sequence of nodes $v_i \in N_Q$ and edges $e_i \in E_Q$ ($1 \leq i \leq m$). Here, every edge in $E_Q$ is visited at least once in a single continuous walk of $G_Q$ starting from node $v_1$. $\gamma_Q^k = <v_1\ e_1 \ldots e_{k-1}\ v_k>$ denotes the length-k prefix of $\gamma_Q$ ($1 \leq k \leq m$) (that is, sub-walk to a k-th node of $\gamma_Q$). If $e_{r-1}$ and $v_r$ are within $\gamma_Q^{r-1}$, the pair $(e_{r-1}, v_r)$ in $\gamma_Q$, that is, a consecutive visit of an edge $e_{r-1}$ and a node $v_r$ is redundant.

Figure 2:
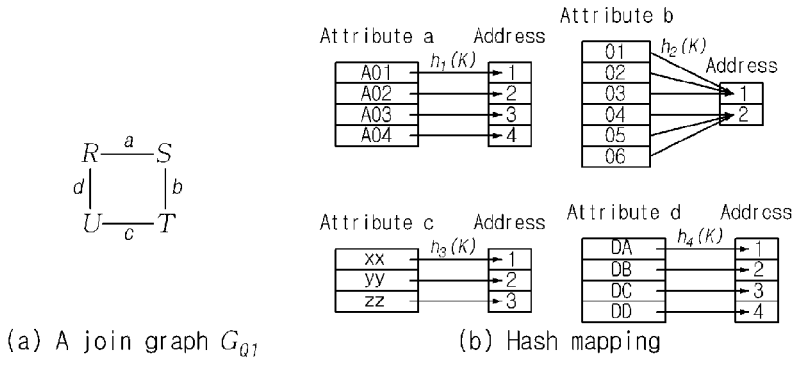
FIG. 2 is a diagram showing an example of a matrix-based synopsis.

FIG. 2 shows an example of a matrix-based synopsis.

In FIG. 2, for a join graph with four join predicates R.a=S.a, S.b=T.b, T.c=U.c and U.d=R.d, $\gamma_{Q1} = <R\ a\ S\ b\ T\ c\ U\ d\ R'>$ is a non-redundant query walk, but $\gamma'_{Q1} = <R\ a\ S\ a\ R\ a\ S\ b\ T\ c\ U\ d\ R>$ is a redundant query walk.

Let $h_k$ denote a hash function with $m_k$ buckets for a join attribute domain $a_k$ in $\gamma_Q$ ($1 \leq k \leq m$). For each node $v_k$ ($1 \leq k \leq m$) in a query walk $\gamma_Q = <v_1\ e_1 \ldots e_{k-1}\ v_k\ e_k \ldots e_{m-1}\ v_m>$ for a join graph $G(N_Q, E_Q)$, a $1 \times m_k$ vector synopsis $M_k$ is constructed if either node $v_k$ has only one edge (k=1 or m) or the join attribute domains $a_{k-1}$ and $a_k$ of its two neighboring edges in the query walk $\gamma_Q$ are the same. A tuple x of the source stream $S_i$ ($S_i \in N_G$) corresponding to the node $v_k$ is assigned to the $h_k(x.a_k)$-th entry of $M_k$, that is, $M_k[h_k(x.a_k)]$ where $x.a_k$ denotes the attribute value of $a_k$ in x. On the other hand, if the join attribute domains $a_{k-1}$ and $a_k$ are different, an $m_{k-1} \times m_k$ matrix synopsis $M_k$ is constructed. The domains $a_{k-1}$ and $a_k$ are called row and column attribute domains of $M_k$, respectively. A tuple y of the source stream $S_j$ corresponding to the node $v_k$ is assigned to the entry $M_k[h_{k-1}(y.a_{k-1}), h_k(y.a_k)]$. When two or more attributes of a source stream are used to express one join predicate, a multiple-key hash function is employed.

When a hash function h for a join predicate R.a=S.b on two source streams R and S is given, if the hash values of x and y are the same, that is, h(x.a)=h(y.b), a tuple x of R and a tuple y of S are buddy tuples. If the tuple of R and the tuple of S are not buddy tuples, the tuple of R and the tuple of S do not satisfy the join predicate. Therefore, if a query walk for an n-way join query is given, a set of n buddy tuples, each of which is a tuple of a distinct source stream can be a candidate for one final result tuple of the query. Such a set is called a complete connecting sequence and defined in Definition 2.

Definition 2. Connecting Sequences

When a query walk $\gamma_Q = <v_1\ e_1 \ldots e_{k-1}\ v_k\ e_k \ldots e_{m-1}\ v_m>$ ($n \leq m$) of a join graph $G(N_Q, E_Q)$ for an n-way join query Q with n source streams $N_G=\{S_1, S_2, \ldots, S_n\}$ ($n \leq m$) is given, let $\xi^k$ ($\subseteq N_Q$) denote the set of distinct nodes in $\gamma_Q^k$ and let $c_j$ denote a tuple of $S_i \in \xi^k$. A k-partial connecting sequence of $\gamma_Q^k$ is a set of $|\xi^k|$ tuples $<c_1, c_2, \ldots {}^c|\xi^k|>$ which contains a pair of buddy tuples for the join predicate of every edge $e_j$ in $\gamma_Q^k$ ($1 \leq j \leq k-1$). A complete connecting sequence is an n-partial connecting sequence.

For an n-way join query Q with n source streams $N_G=\{S_1, S_2, \ldots, S_n\}$, when a tuple of a source stream $S_i$ ($1 \leq i \leq n$) is a part of at least one complete connecting sequence, it is called a connecting tuple of $S_i$. Not all of the connecting tuples of $S_i$ are successful tuples due to hash key collisions. Therefore, a final result tuple of the query is obtained by a complete connecting sequence whose connecting tuples are all successful tuples.

In order to represent a set of tuples that are currently in the sliding window of each source stream, two different types of matrix-based synopses are actually constructed in compile time. They are called a window synopsis W and a window index synopsis WI. Even though the sizes of these two paired matrices are the same, an entry of a window synopsis manages the number of tuples assigned to the entry while that of a window index synopsis manages a list of addresses to those tuples that are assigned to the entry. Consequently, the entry value of a window synopsis is equal to the length of a list of addresses in the corresponding entry of the paired window index synopsis. A window index synopsis is used only in the evaluation phase.

For example, suppose that the join attribute domains a, b, c and d in FIG. 2 are {A1, A2, A3, A4}, {01, 02, . . . , 06}, {xx, yy, zz} and {DA, DB, DC, DD} respectively. FIG. 2B shows the hash functions of these domains. Valid tuples of the current window of each source stream are shown in FIG. 2C. Here, $r_i$, $s_i$, $t_i$ and $u_i$ ($1 \leq i \leq 4$) denote the addresses of the tuples in the windows. For each node of $\gamma_{Q1}$=<R a S b T c U d R'>, a pair of a window synopsis and a window index synopsis is constructed as shown in FIG. 2D.

1.2 Query Equations

The method for processing a multi-way join query according to the exemplary embodiment of the present invention employs two different types of matrix multiplication operation, that is, matrix multiplication (x) and element-wise array multiplication ($\otimes$) as follows.

1) Matrix Multiplication "x";

If a $1 \times m_1$ vector synopsis X and an $m_1 \times m_2$ matrix synopsis Y are given, a $1 \times m_2$ result vector Z is produced by a matrix multiplication Z=X×Y as follows:

$$Z[j] = \sum_{i=1}^{i=m_2} X[i] \times Y[i, j], 1 \leq j \leq m_2$$

2) Element-Wise Array Multiplication $\otimes$:

If two $1 \times m$ vector synopses X and Y are given, a $1 \times m$ result vector Z is produced by an element-wise array multiplication Z=X$\otimes$Y as follows:

$Z[i]=X[i] \times Y[i], 1 \leq j \leq m$.

In order to estimate the total number of the final result tuples of the query, a query equation in Definition 3 is formulated for a query walk by transforming the k-th edge $e_k$ in the query walk into the k-th matrix multiplication in the equation.

Definition 3. Query Equation

When a query walk $\gamma_Q$=<$v_1$ $e_1$ $v_2$ $e_2$ . . . $e_{m-1}$ $v_m$> ($n \leq m$) of a join graph G=($N_Q$,$E_Q$) for an n-way join query Q over n source streams $N_G$={$S_1$, $S_2$, . . . , $S_n$} is given, let the number of buckets for the hash function of the join attribute domain of the edge $e_i$ be $m_j$ ($1 \leq j \leq m$). A query equation E($\gamma_Q$) is a sequence of matrix multiplication operation on the window synopsis $W_i$ of the nodes $v_i$ ($1 \leq i \leq m$) in $\gamma_Q$ as follows.

$E(\gamma_Q)=W_1*W_2*\ldots W_m$

Where $W_i$ is either a $1 \times m_i$ vector or an $m_{i-1} \times m_i$ matrix.

If $W_{k+1}$ is a two-dimensional synopsis, the k-th multiplication in E($\gamma_Q$) becomes a matrix multiplication operation (x). Otherwise, it becomes an element-wise array multiplication operation ($\otimes$). The multiplication operations up to the k-th window synopsis $W_k$ of E($\gamma_Q$) result in a $1 \times m_k$ partial result vector $V_k$($k \leq m$). The attribute domain of $V_k$ is an attribute domain $a_k$ of the k-th edge $e_k$ of the query walk. Each entry of $V_k$ maintains the number of k-partial connecting sequences hashed into the entry. The sum of all the entries of the final result vector $V_m$ is the total number of the complete connecting sequences of the query and it is also the maximum possible number of the final result tuples of the query. The evaluation cost of a query equation basically depends on the route of its query walk. To minimize the cost, the optimal query walk needs to be found. The cost of a query equation is the sum of the cost of all multiplication operations in the equation. The complexity of a matrix multiplication operation depends on the sizes of its two operands. Since the size of a synopsis for each node of the query walk is determined in compile time, the optimal query walk can be found by enumerating all possible query walks without any run-time burden.

2.2-Phase Query Processing 2.1 Preprocessing Phase

A sliding-window join operation which is suggested in a reference "Lukasz Golab and M. Tamer Ozsu, Processing sliding window multi-joins in continuous queries over data streams, sources In VLDB, 2003" is a typical way of evaluating a join operation over infinite data streams. It is composed of three tasks: inserting, probing, and invalidating. If a join operation over two operand streams $R_1$ and $R_2$ are given, whenever a new tuple $e_1$ of $R_1$ arrives, an inserting task adds $e_1$ to the sliding window of $R_1$ first. Subsequently, a probing task is performed between $e_1$ and the tuples in the window of $R_2$. When the join attribute value of a tuple $e_2$ in $R_2$ is the same as that of $e_1$, the two tuples $e_1$ and $e_2$ are combined to be the result of the join operation. Finally, an invalidating task removes all the old-dated tuples in $R_1$. These steps are symmetrically executed when a new tuple of $R_2$ arrives.

In the exemplary embodiment of the present invention, a number of consecutive source tuples form a batch which is a unit of inserting, probing and invalidating operations for a source stream. The minimum size of the batch is a single tuple but the size of the batch can be adjusted depending on the current workload. The information about the newly incoming tuples of the new batch of each source stream is separately managed. For this purpose, a pair of the batch synopsis B and the batch index synopsis BI is additionally constructed for each node of the query walk. The structures of the batch synopsis and the batch index synopsis are identical to those of the window synopsis and the window index synopsis, respectively. If a query walk $\gamma_Q$ of a join graph G($N_Q$,$E_Q$) is given, in order to evaluate its query equation E($\gamma_Q$) for the new batch $\Delta S_x$ of a source stream $S_x$ ($\in N_Q$), among the window synopsis of E($\gamma_Q$), the window synopsis corresponding to the stream $S_x$ are replaced by its corresponding batch synopsis. This modified query equation is called a batched query equation E($\gamma_Q|\Delta S_x$). The following three tasks are performed in sequence for the evaluation of a batched query equation E($\gamma_Q|\Delta S_x$): (1) Inserting: According to the newly incoming tuples of the new batch $\Delta S_x$, update all the synopses of the four types W, WI, B and BI for the stream Sx; (2) matrix multiplying: Evaluate the batched query equation E($\gamma_Q|\Delta S_x$); (3) Invalidating: Remove the out-of-window tuples of the last batch of the stream $S_x$ in the window index synopsis corresponding to the stream $S_x$ and update the entries of window synopsis which are paired with the window index synopsis accordingly.

Figure 3:
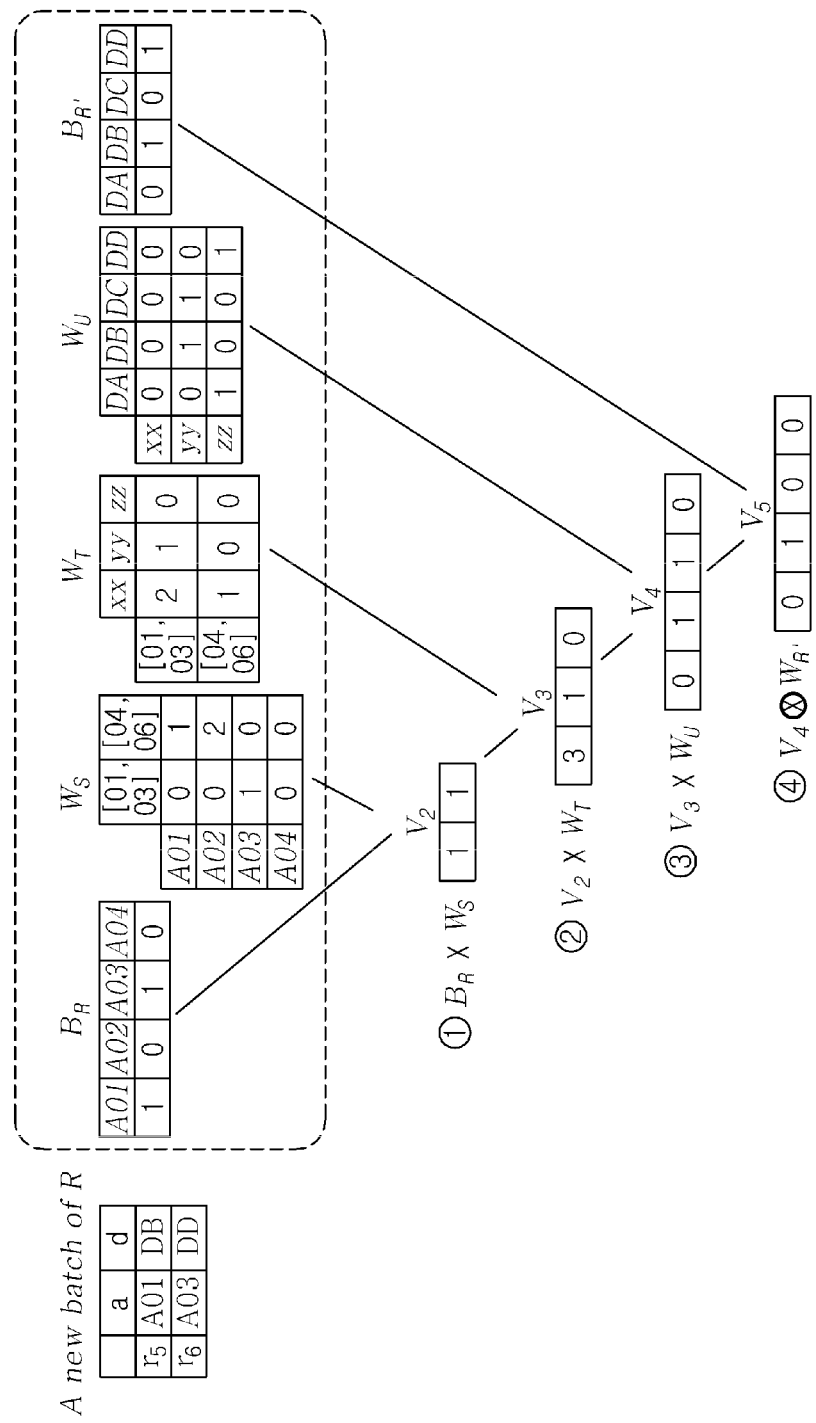
FIG. 3 shows an evaluation of a query equation.

FIG. 3 shows an evaluation of a query equation. For the query walk $\gamma_{Q1}$=<R a S b T c U d R'> in FIG. 2, the batched query equation of the new batch $\Delta R$ in FIG. 3 becomes E($\gamma_{Q1}|\Delta R$)=$B_R \times W_S \times W_T \times W_U \otimes B_{R'}$. According to the new tuples of $\Delta R$, batch synopses $B_R$ and $B_{R'}$ of the stream R are populated. The first matrix multiplication $B_R \times W_S$ generates the result vector $V_2$=[1,1]. This result vector indicates that two 2-partial connecting sequences are found. These 2-partial connecting sequences are addressed by the hash function of $h_b(x)$ of the column attribute domain 'b' of $W_S$. Similarly, the subsequent matrix multiplications $V_2 \times W_T$ and $V_3 \times W_U$ produce $V_3$=[3,1,0] and $V_4$=[0,1,1,0] respectively. Finally, element-wise array multiplication $V_4 \otimes B_{R'}$ produces a final result vector $V_5$=[0,1,0,0]. This indicates that the new tuples of $\Delta R$ produce one complete connecting sequence.

FIG. 4 shows a pseudo code of the preprocessing phase for an n-way join query.

If every entry of the final result vector obtained by $E(\gamma_Q|\Delta S_x)$ is zero, no source tuple in $\Delta S_x$ satisfies the query Q. If the entry of the final result vector is not zero, some tuples in $\Delta S_x$ may satisfy Q but the result vector may contain some false positive errors. There are three different causes for the false positive errors. The first one is due to the collisions of a hash function. To measure the effects of this type, the packing density $\rho$ of a window or batch synopsis K is defined as follows:

$$\rho(K)=|K|/E$$

Here, |K| denotes the number of tuples hashed into K and $^K$ denotes the number of entries in K. As in a hash index, the packing density of a window or batch synopsis influences on the error rate of this type. Therefore, if a predefined threshold $\epsilon$ is given and the average packing density of the window or batch synopsis in a batched query equation becomes higher than $\epsilon$, the evaluation phase should be additionally executed to guarantee the accuracy of a detection-only query. The second type of an error is due to batched processing. Since a batch is a unit of invalidating, the sliding window of a source stream may include some out-of-window tuples, which were not deleted because the last batch for an invalidating operation has not been fully populated yet. Consequently, the entries of window synopsis may contain some false positive counts. As the size of a batch gets larger, the error rate of this type is enlarged. The last type of an error occurs when a node of a join graph is visited more than once in a query walk. This makes the window synopsis of the same source stream be multiplied more than once. This type of an error is called a duplicated multiplication error. While a single path-join query does not suffer from this error type, both a multi-way star-join query and a cyclic join query may do suffer from this error type.

2.2 Evaluation Phase

The second phase generates the accurate set of the final result tuples of the batched query equation $E(\gamma_Q|\Delta S_x)$. The second phase is further divided into two steps: identification and materialization. The identification step refines the entries of all the intermediate result vectors of $E(\gamma_Q|\Delta S_x)$, so that it discards those entries that cannot lead to any complete connecting sequence. Subsequently, the materialization step produces the final result tuples for $\Delta S_x$ by concatenating only the successful tuples of each source stream based on the refined intermediate result vectors.

2.2.1 Identification Step

A non-zero entry of a result vector $V_k$ ($2 \leq k \leq m$) obtained by the forward evaluation of the batched query equation in the first step indicates the number of k-partial connecting sequences hashed to the entry. Not all of these k-partial connecting sequences become complete connecting sequences. The entries of the final result vector $V_m$ contain the number of complete connecting sequences. Based on $V_m$, each intermediate result vector $V_k$ ($1 \leq k \leq m-1$) is refined one by one from $V_{m-1}$ to $V_2$ by the backward evaluation of the batched query equation. For an element-wise multiplication operation $V_k \otimes W_{k+1} \equiv \tilde{V}_{k+1}$ ($1 \leq k \leq m-1$) on a $1 \times m_k$ result vector $V_k$ and a $1 \times m_k$ vector $W_{k+1}$, if the i-th entry $\tilde{V}_{k+1}[i]$ of the refined result vector $\tilde{V}_{k+1}$ is not zero, the k-partial connecting sequences in the i-th entry $V_k[i]$ of $V_k$ can produce at least one complete connecting sequence. Accordingly, the $1 \times m_k$ result vector $V_k$ is refined as $\tilde{V}_k$ by assigning $\tilde{V}_{k+1}[i]$ into $\tilde{V}_k[i]$ ($1 \leq i \leq m_k$). On the other hand, for a matrix multiplication operation $V_k \times W_{k+1} \equiv \tilde{V}_{k+1}$ on a $1 \times m_k$ result vector $V_k$ and an $m_k \times m_{k+1}$ matrix $W_{k+1}$, the k-partial connecting sequences in the entry $V_k[i]$ of $V_k$ can produce at least one complete connecting sequence if there exists more than one connecting tuple in at least one entry of the i-th row of $WI_{k+1}$. Such a case occurs when there is at least one pair of a non-zero entry $W_{k+1}[i,j]$ and a non-zero entry $\tilde{V}_{k+1}[j]$ for the same value of j ($1 \leq j \leq m_{k+1}$). Therefore, the $1 \times m_k$ vector $V_k$ is refined as $\tilde{V}_k$ by assigning the inner product of $\tilde{V}_{k+1}$ and the i-th row of $W_{k+1}$ into $\tilde{V}_k[i]$.

With respect to the refined vector $\tilde{V}_{k+1}$, the result vector $V_k$ of a multiplication $V_k * W_{k+1}$ is refined as $\tilde{V}_k$ by the following equations:

$$\tilde{V}_k = \begin{bmatrix} \tilde{V}_{k+1} & \text{if } * = \otimes \\ \tilde{V}_{k+1} \times W_{k+1}^T & \text{if } * = \times \end{bmatrix} \quad \begin{array}{l} \text{Eq (1)} \\ \text{Eq (2)} \end{array}$$

Figure 5:
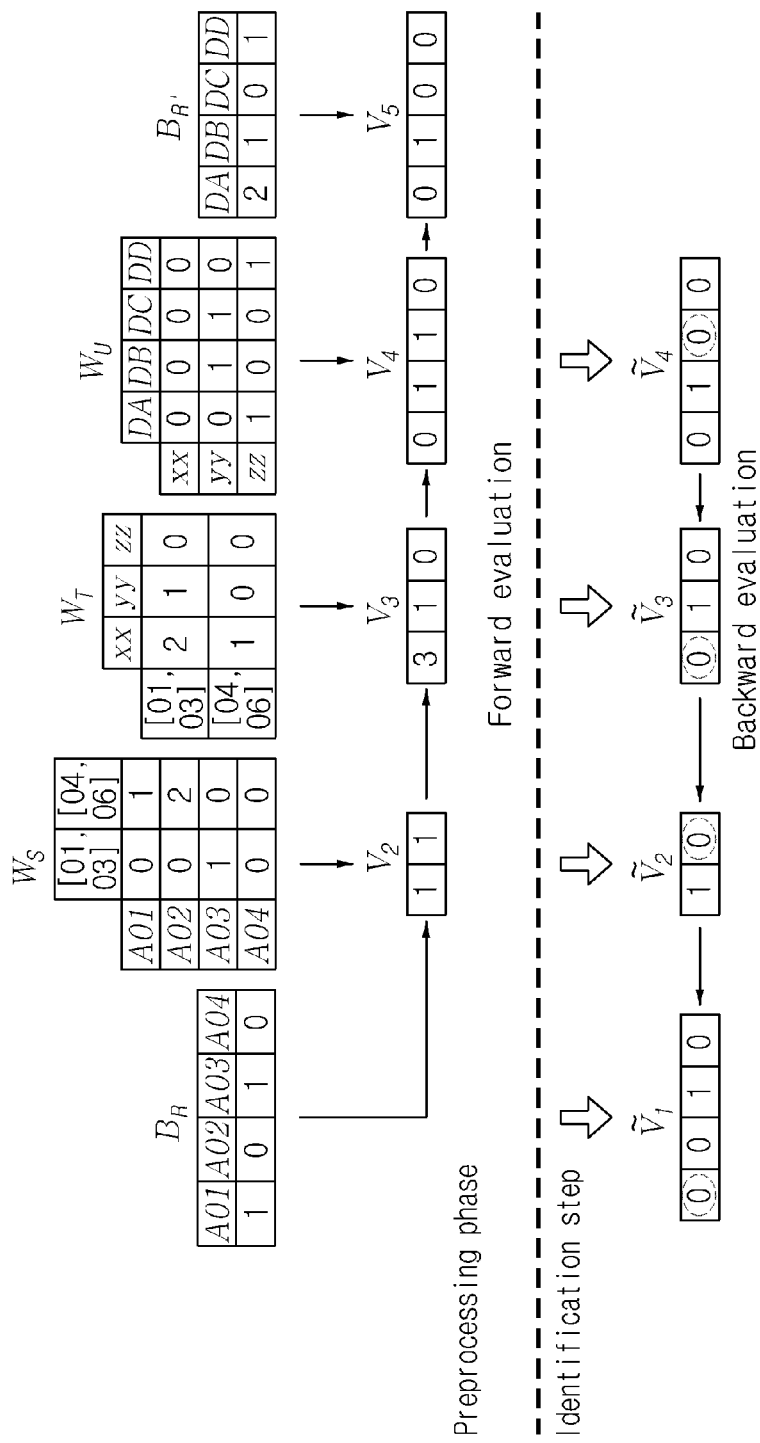
FIG. 5 shows how an identification step is performed in the example of FIG. 2.

FIG. 5 illustrates how the identification step is performed for the example of FIG. 2. While $V_5[1]$ is assigned into $\tilde{V}_4[i]$ (14) by Eq (1), $\tilde{V}_3=[0,1,0]$ is produced by Eq (2). Subsequently, $V_2$ and $V_1$ are refined by $\tilde{V}_3 \times W_3^T$ and $\tilde{V}_2 \times W_2^T$ respectively. FIG. 6 shows the detailed pseudo code of the identification stage.

2.2.2 Materialization Step

Based on the refined result vectors of $E(\gamma_Q|\Delta S_x)$, this step explicitly materializes the final result tuples of query Q. For this purpose, a query index equation $EI(\gamma_Q)$ is additionally defined in Definition 4. Basically, the window synopses of $E(\gamma_Q)$ are replaced by their paired window index synopses respectively to construct the query index equation. However, if the query walk $\gamma_Q$ contains some redundant pairs of an edge and a node, the window index synopses for all the redundant pair(s) are not included in $EI(\gamma_Q)$ Definition 4. Query Index Equations If the query equation $E(\gamma_Q)=W_1 * W_2, \ldots * W_m$ of a query walk $\gamma_Q=<v_1 \, e_1 \, \ldots \, e_{k-1} \, v_k \, e_k \, \ldots \, e_{m-1} \, v_m>$ is given, its non-redundant walk $\overline{\gamma_Q}=<v_1 \, e_1 \, \ldots \, e_{k-1} \, v_k \, e_k \, \ldots \, e_{m-1} \, v_m>$ ($1 \leq m$) is produced by removing all the redundant pairs of an edge and a node in $\gamma Q$. The query equation $E(\overline{\gamma_Q})$ of $\overline{\gamma_Q}$ is transformed to be the query index equation $EI(\gamma Q)$ of $\gamma Q$ by substituting the window synopses in $E(\overline{\gamma_Q})$ by their paired window index synopses respectively. In addition, every multiplication operation in $E(\overline{\gamma_Q})$ is replaced by an enumeration operation ($\diamond$) as follows:

$$EI(\gamma)=WI_1 \diamond WI_2 \diamond, \ldots, WI_{i \ldots} \diamond {WI_l}^T$$
$$(2 \leq i \leq l \leq m)$$

Like a batched query equation, to evaluate the new batch $\Delta S_x$ of a source stream $S_x$, every window index synopsis corresponding to the stream $S_x$ is replaced by its corresponding batch index synopsis. This modified query equation is called a batched query index equation $EI(\gamma_Q|\Delta S_x)$. Let $\tilde{V}_k$ be the refined result vector of the join predicate corresponding to the edge $e_{k-1}$ of $\overline{\gamma_Q}$. Only when $\tilde{V}_1[i] \neq 0$, the i-th entry of the first index synopsis contains at least one connecting tuple. Therefore, the first result index synopsis $RI_1$ is created by copying the i-th entry of the first synopsis in $EI(\gamma_Q)$ if $V_l[i] \neq 0$. Ultimately, a batched query index equation $EI(\gamma_Q|\Delta S_x)$ is represented as follows:

$$EI(\gamma_Q|\Delta S_x)=RI_l \diamond H_2 \diamond, \ldots, \diamond H_l^T \cdot H_i \in \{BI_i \text{ or } WI_i\},$$

Each enumeration operation $RI_{k-1} \diamond H_k$ ($2 \leq k \leq 1$) in $EI(\gamma_Q|\Delta S_x)$ is one of the following two different types: concatenation ($\boxtimes$) and self-filtering ($\ominus$):

$$RI_k = \begin{cases} RI_{k-1} \diamond H_k = \begin{bmatrix} RI_{k-1} \boxtimes H_k & \text{if } e_{k-1} \text{ and } v_k \notin \overline{V_Q^{k-1}} \\ RI_{k-1} \ominus H_k & \text{otherwise} \end{bmatrix} & (2 \le k \le l) \end{cases}$$

Here, an $RI_k$ vector denotes a result index vector of the (k−1)th enumeration operation.

If a $1 \times m_a$ result index vector $RI_{k-1}$ and a window or batch index synopsis $H_k$ ($2 \le k \le 1$) are given, only when $\tilde{V}_k[i] \neq 0$, a concatenation operation $RI_{k-1} \boxtimes H_k$ produces a result index vector $RI_k$. Each entry $RI_k[i]$ maintains the join results between the set of connecting tuples in each entry of the i-th column of $H_k$ and the set of partial result tuples in its corresponding entry of $RI_{k-1}$ as follows:

$$\text{if } \tilde{V}_k[i] \neq 0. RI_k[i] \ (1 \le i \le m_b) = \begin{bmatrix} U_{j=1}^{m_a}(RI_{k-1}[j] \bowtie_a H_k[j,i]) & \text{when } H_k \text{ is an } m_a \times m_b \text{ matrix} \\ RI_{k-1}[i] \bowtie_a H_k[i] & \text{when } H_k \text{ is a } l \times m_a \text{ vector} \end{bmatrix}$$

Here, $\bowtie_a$ denotes a conventional join operation on an attribute domain a.

When the redundant pairs of the original query walk $\gamma_Q$ are removed, the size of window or batch index synopsis in $EI(\gamma_Q|\Delta S_x)$ may not be seamlessly aligned. In other words, the column attribute domain of a result index vector $RI_{k-1}$ is not the same as the join attribute domain of the edge $e_{k-1}$ of the subsequent window or batch index synopsis $H_k$ in $EI(\gamma_Q|\Delta S_x)$ ($1 \le k \le 1$). Therefore, in such a case, before executing the concatenation operation, an additional reassignment operation is required to rehash the partial result tuples with respect to the hash function of the join attribute domain of the edge $e_{k-1}$ of the subsequent window or batch index synopsis $H_k$.

If a $1 \times m_a$ result index vector $RI_{k-1}$ and a window or batch index synopsis $H_k$ ($2 \le k \le 1$) are given, a self-filtering operation $RI_k = RI_{k-1} \ominus H_k$ performs the (k−1)-th join predicate of $EI(\gamma_Q|\Delta S_x)$ as a selection predicate. In other words, among the partial result tuples of each entry $RI_{k-1}[i]$ ($1 \le i \le m_a$), those tuples which do not satisfy the join predicate are removed.

Figure 7:
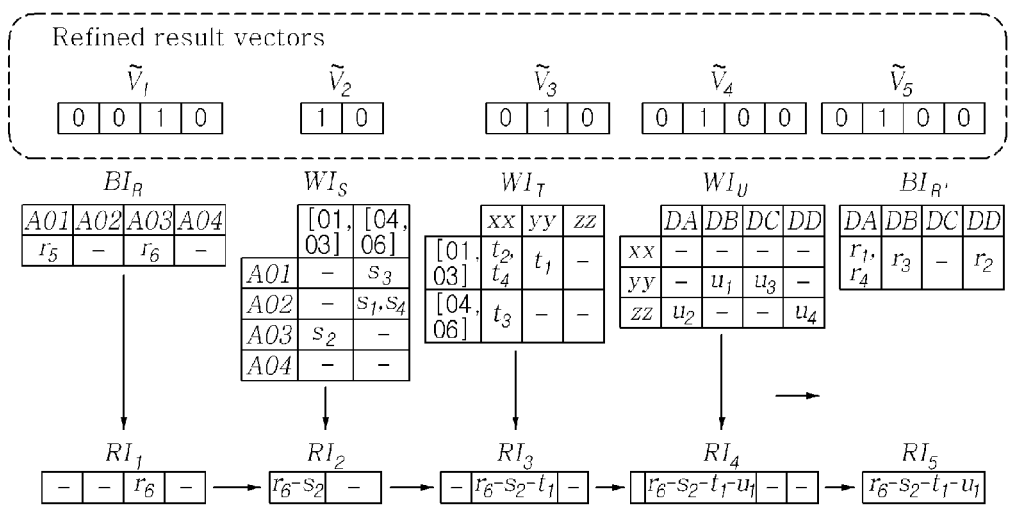
FIG. 7 shows how an arrangement query index equation is evaluated.

To execute the materialization step for the example shown in FIG. 5, the first three enumeration operations become concatenation operations since every node and edge up to $v_4$ are firstly visited. However, the last enumeration operation becomes a self-filtering operation since the edge $e_4$ for the join predicate U.d=R.d is firstly visited but the node $v_5$ corresponding to the stream R has been visited in the query walk. FIG. 7 shows how the batched query index equation $EI(\gamma_{Q_1}|\Delta S_x) = RI_1 \boxtimes BI_2 \boxtimes WI_3 \boxtimes WI_4 \ominus WI_5^T$ is evaluated. Referring FIG. 7, the batched query index equation is performed to generate the result index vector $RI_k$ ($1 \le i \le 5$). The result index vector has the address of the final result tuple as the entry. FIGS. 8A and 8B show the detailed pseudo code of the materialization step.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired-network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for processing a multi-way join query, comprising:
   (a) with respect to a join graph where the respective source streams are denoted by a node and a join predicate is denoted by an edge for the multi-way join query, generating a query walk that is a sequence of nodes and edges in the join graph such that every edge in the join graph is visited at least once in a continuous walk of the join graph starting from a specific node;
   (b) based on the query walk, generating matrix based synopses for the nodes, where the matrix based synopses include a window synopsis that manages the number of tuples allocated to entries, a window index synopsis that manages a list of addresses of the tuples assigned to the entry, a batch synopsis that is a batch of the window synopsis, and a batch index synopsis that is a batch of the window index synopsis;
   (c) when a hash function is given to a join attribute domain of the query walk, if the source stream is input, hashing the tuple of the source stream by the hash function to fill the window synopsis, the window index synopsis, the batch synopsis, and the batch index synopsis;

(d) when the query equation is defined by the matrix multiplication operation of the window synopses corresponding to the nodes of the query walk, and the batched query equation is defined by the query equation in which a window synopsis corresponding to a specific stream is replaced with a batch synopsis corresponding to the specific stream in the query equation, evaluating the batched query equation to generate a result vector;

(e) based on the result vector, generating the result tuple for the multi-way join query from the batch index synopsis and the window index synopsis;

(e1) under a join predicate where two source streams are joined with a certain join attribute, when tuples of two streams having the same hash value of the hash function are defined as buddy tuples and when the sequence is defined as a complete connecting sequence if a join graph of a multi-way join query that joins n source streams and the query walk are given and all tuples in a sequence having a distance of n, which consists of tuples of the source streams are buddy tuples, performing backward evaluation using the result vector of the batched query equation and an intermediate result vector to refine the intermediate result vector so as to remove an entry that cannot be a candidate for any of complete connecting sequence from the intermediate result vector; and (e2) based on the refined result vector, generating a result index vector having an address of the result tuples as an entry from the batch index synopsis and the window index synopsis.

2. The method of claim 1, wherein in step (b), with respect to the nodes of the query walk, if either node has only one edge or the join attribute domains of its two neighboring edges of the node in the query walk are the same, a vector synopsis having entries as many as the number of buckets of the corresponding hash function is produced, in contrast, if the join attribute domains of the neighboring edges of the node are different, a matrix synopsis having a column and a row corresponding to the number of buckets of two hash functions is produced.

3. The method of claim 2, wherein the query is defined as follows:

if a join graph $G_Q=(N_Q, E_Q)$ for an n-way join query Q with n source streams $N_G=\{S_1, S_2, \ldots, S_n\}$ is given, a query walk $\gamma_Q=<v_1\ e_1\ v_2\ e_2 \ldots e_{m-1}\ v_m>(n \leq m)$ is a sequence of nodes $v_i \in N_Q$ and edges $e_i \in E_Q$ ($1 \leq i \leq m$), in which every edge in $E_Q$ is visited at least once in a single continuous walk of $G_Q$ starting from node $v_1$.

4. The method of claim 3, wherein the vector synopsis and the matrix synopsis are produced as follows:

if $h_k$ denote a hash function with $m_k$ buckets for a join attribute domain $a_k$ in $\gamma_Q$ ($1 \leq k \leq m$), for each node $v_k$ ($1 \leq k \leq m$) in the query walk, a $1 \times m_k$ vector synopsis $M_k$ is constructed if either node $v_k$ has only one edge (k=1 or m) or the join attribute domains $a_{k-1}$ and $a_k$ of its two neighboring edges in the query walk $\gamma_Q$ are the same, in contrast, if the join attribute domains $a_{k-1}$ and $a_k$ are different from each other, an $m_{k-1} \times m_k$ matrix synopsis $M_k$ is constructed.

5. The method of claim 4, wherein a tuple of the source stream is assigned to the vector synopsis or the matrix synopsis as follows:

with respect to the vector synopsis $M_k$, a tuple x of the source stream $S_i$ ($S_i \in N_G$) corresponding to the node $v_k$ is assigned to the $h_k(x.a_k)$-th entry of $M_k$, that is, $M_k[h_k(x.a_k)]$ (where $x.a_k$ denotes the attribute value of $a_k$ in x), and with respect to the matrix synopsis $M_k$, tuple y of the source stream $S_i$ corresponding to the node $v_k$ is assigned to the entry $M_k[h_{k-1}(y.a_{k-1}), h_k(y.a_k)]$.

6. The method of claim 2, wherein the matrix multiplication operation is defined as follows: If a $1 \times m_1$ vector synopsis X and an $m_1 \times m_2$ matrix synopsis Y are given, a $1 \times m_2$ result vector Z is produced by a matrix multiplication $Z=X \times Y$ as follows:

$$Z[j] = \sum_{i=1}^{i=m_1} X[i] \times Y[i,j] \sum_{k=0}^{m_2} JA_1[k] \times JA_2[kj] \sum_{k=0}^{m_2} JA_1[k] \times JA_2[kj],$$

$$1 \leq j \leq m_2$$

and if two $1 \times m$ vector synopses X and Y are given, a $1 \times m$ result vector Z is produced by an element-wise array multiplication $Z = X \otimes Y$ as follows:

$$Z[i]=X[i] \times Y[i], 1 \leq j \leq m.$$

7. The method of claim 6, wherein the query equation is defined as follows:

when a query walk $\gamma_Q=<v_1\ e_1\ v_2\ e_2 \ldots e_{m-1}\ v_m>(n \leq m)$ of a join graph $G=(N_Q, E_Q)$ for an n-way join query C) over n source streams $N_G=\{S_1, S_2, \ldots, S_n\}$ is given, and the number of buckets for the hash function of the join attribute domain of the edge $e_i$ is $m_j$ ($1 \leq j \leq m$), a query equation $E(\gamma_Q)$ is a sequence of matrix multiplication operation on the window synopsis $W_i$ of the nodes $v_i$ ($1 \leq i \leq m$) in $\gamma_Q$ as follows:

$$E(\gamma_Q)=W_1 * W_2 * \ldots W_m$$

where $W_i$ is either a $1 \times m_i$ vector or an $m_{i-1} \times m_i$ matrix and if $W_{k+1}$ is a two-dimensional synopsis, the k-th multiplication operation in $E(\gamma_Q)$ becomes a matrix multiplication operation ($\times$), but if $W_{k+1}$ is not the two-dimensional synopsis, it becomes an element-wise array multiplication operation ($\otimes$).

8. The method of claim 1, wherein in step e1, the k-partial connecting sequence and the complete connecting sequence are defined as follows:

if a query walk $\gamma_Q=<v_1\ e_1\ v_2\ e_2 \ldots e_{m-1}\ v_m>$ of a join graph $G_Q=(N_Q, E_Q)$ for an n-way join query C) with n source streams $N_G=\{S_1, S_2, \ldots, S_n\}$ ($n \leq m$) is given, and $\xi^k$ ($\subset N_Q$) denotes a set of distinct nodes in $\gamma_Q^k$ ($\gamma_Q^k = <v_1\ e_1 \ldots e_{k-1}\ v_k>$ denotes a length-k prefix of $\gamma_Q$ ($1 \leq k \leq m$)) and Ci denotes a tuple of $S_i \in \xi^k$ ($1 \leq k \leq m$)), a k-partial connecting sequence of $\gamma_Q^k$ is a set of $|\xi^k|$ tuples $<c_1, c_2, \ldots {}^{c_l}\xi^k|>$ which contains a pair of buddy tuples for the join predicate of every edge $e_j$ ($1 \leq j \leq k-1$) in $\gamma_Q^k$ and a complete connecting sequence is an n-partial connecting sequence.

9. The method of claim 1, wherein in step e1, when the query equation is $W1*W2* \ldots *Wm$, if the intermediate result vector is $V_k$ ($2 \leq k \leq m$), and the refined intermediate result vector is $\tilde{V}_k$, $\tilde{V}_k$ is obtained by the following equation:

$$\tilde{V}_k = \begin{cases} \tilde{V}_{k+1} & \text{if } * = \otimes \qquad \text{Eq (1)} \\ \tilde{V}_{k+1} \times W_{k+1}^T & \text{if } * = \times \qquad \text{Eq (2)} \end{cases}$$

Where if a $1 \times m_1$ vector synopsis X and an $m_1 \times m_2$ matrix synopsis Y are given, a matrix multiplication $Z=X \times Y$ is defined as follows:

$$Z[j] = \sum_{i=1}^{i=m_1} X[i] \times Y[i, j] \sum_{k=0}^{m_2} JA_1[k] \times JA_2[kj] \sum_{k=0}^{m_2} JA_1[k] \times JA_2[kj],$$

$$1 \leq j \leq m_2,$$

and if two 1×m vector synopses X and Y are given, an element-wise array multiplication Z=X⊗Y is defined as follows:

$Z[j]=X[j]\times Y[j], 1 \leq j \leq m.$

10. The method of claim 1, wherein step e2 includes:
generating a query index equation by replacing a window index synopses of the query equation with the corresponding window index synopses, generating a batched query index equation by replacing a window index synopsis corresponding to the specific source stream in the query index equation with a batch index synopsis corresponding to the specific stream, and generating a result index vector having addresses of the result tuple as an entry using the batch query index equation.

11. A non-transitory computer readable recording medium including computer executable instructions for processing a multi-way join query, comprising instructions for:
(a) with respect to a join graph where the respective source streams are denoted by a node and a join predicate is denoted by an edge for the multi-way join query, generating a query walk that is a sequence of nodes and edges in the join graph such that every edge in the join graph is visited at least once in a continuous walk of the join graph starting from a specific node;
(b) based on the query walk, generating matrix based synopses for the nodes, where the matrix based synopses include a window synopsis that manages the number of tuples allocated to entries, a window index synopsis that manages a list of addresses of the tuples assigned to the entry, a batch synopsis that is a batch of the window synopsis, and a batch index synopsis that is a batch of the window index synopsis;
(c) when a hash function is given to a join attribute domain of the query walk, if the source stream is input, hashing the tuple of the source stream by the hash function to fill the window synopsis, the window index synopsis, the batch synopsis, and the batch index synopsis;
(d) when the query equation is defined by the matrix multiplication operation of the window synopses corresponding to the nodes of the query walk, and the batched query equation is defined by the query equation in which a window synopsis corresponding to a specific stream is replaced with a batch synopsis corresponding to the specific stream in the query equation, evaluating the batched query equation to generate a result vector;
(e) based on the result vector, generating the result tuple for the multi-way join query from the batch index synopsis and the window index synopsis;
(e1) under a join predicate where two source streams are joined with a certain join attribute, when tuples of two streams having the same hash value of the hash function are defined as buddy tuples and when the sequence is defined as a complete connecting sequence if a join graph of a multi-way join query that joins n source streams and the query walk are given and all tuples in a sequence having a distance of n, which consists of tuples of the source streams are buddy tuples, performing backward evaluation using the result vector of the batched query equation and an intermediate result vector to refine the intermediate result vector so as to remove an entry that cannot be a candidate for any of complete connecting sequence from the intermediate result vector; and
(e2) based on the refined result vector, generating a result index vector having an address of the result tuples as an entry from the batch index synopsis and the window index synopsis.

12. A method for processing a multi-way join query, comprising:
(a) with respect to a join graph where the respective source streams are denoted by a node and a join predicate is denoted by an edge for the multi-way join query, generating a query walk that is a sequence of nodes and edges in the join graph such that every edge in the join graph is visited at least once in a continuous walk of the join graph starting from a specific node;
(b) based on the query walk, generating matrix based synopses for the nodes, where the matrix based synopses include a window synopsis that manages the number of tuples allocated to entries, a window index synopsis that manages a list of addresses of the tuples assigned to the entry, a batch synopsis that is a batch of the window synopsis, and a batch index synopsis that is a batch of the window index synopsis wherein with respect to the nodes of the query walk, if either node has only one edge or the join attribute domains of its two neighboring edges of the node in the query walk are the same, a vector synopsis having entries as many as the number of buckets of the corresponding hash function is produced, in contrast, if the join attribute domains of the neighboring edges of the node are different, a matrix synopsis having a column and a row corresponding to the number of buckets of two hash functions is produced;
(c) when a hash function is given to a join attribute domain of the query walk, if the source stream is input, hashing the tuple of the source stream by the hash function to fill the window synopsis, the window index synopsis, the batch synopsis, and the batch index synopsis;
(d) when the query equation is defined by the matrix multiplication operation of the window synopses corresponding to the nodes of the query walk, and the batched query equation is defined by the query equation in which a window synopsis corresponding to a specific stream is replaced with a batch synopsis corresponding to the specific stream in the query equation, evaluating the batched query equation to generate a result vector; and
(e) based on the result vector, generating the result tuple for the multi-way join query from the batch index synopsis and the window index synopsis.

\* \* \* \* \*